(12) United States Patent
Jolley

(10) Patent No.: US 6,637,285 B2
(45) Date of Patent: Oct. 28, 2003

(54) STEERING COLUMN TILT SYSTEM MULTIPLIER

(75) Inventor: William A Jolley, Waterford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 27 days.

(21) Appl. No.: 10/036,334

(22) Filed: Dec. 27, 2001

(65) Prior Publication Data
US 2003/0121353 A1 Jul. 3, 2003

(51) Int. Cl.[7] .................................................. B62D 1/16
(52) U.S. Cl. ............................... 74/495; 74/492; 74/516
(58) Field of Search ........................... 74/492, 493, 495, 74/516, 517, 518; 250/775, 777

(56) References Cited

U.S. PATENT DOCUMENTS

| 1,348,997 | A | * | 8/1920 | Hunt | 74/485 |
| 1,531,467 | A | * | 3/1925 | McWhite | 180/315 |
| 5,775,173 | A | * | 7/1998 | Wagner | 74/502.2 |
| 5,802,926 | A | * | 9/1998 | Thomas | 74/493 |
| 6,167,777 | B1 | * | 1/2001 | Snell | 74/493 |
| 6,189,405 | B1 | * | 2/2001 | Yazane | 74/493 |
| 6,244,128 | B1 | * | 6/2001 | Spencer et al. | 74/493 |

FOREIGN PATENT DOCUMENTS

EP         0 390 591      * 10/1990

* cited by examiner

Primary Examiner—Douglas C. Butler
Assistant Examiner—Bradley King
(74) Attorney, Agent, or Firm—Donald J. Wallace

(57) ABSTRACT

A steering column assembly is provided and includes a lower steering column member, an upper steering column member pivotally attached to the lower steering column member, and a locking mechanism operably interconnecting the upper and lower steering column members and selectively actuable for locking the upper steering column member in one of a plurality of pivot positions relative to the lower steering column member and a lever mechanism operably interconnected with the locking member for selectively actuation the locking member. The lever mechanism includes a release lever, a multiplying lever in operable communication with the locking mechanism, and a link interconnecting the release lever and the multiplying lever. The link transfers an input force applied to the release lever for multiplication through the multiplying lever for actuating the locking mechanism.

11 Claims, 3 Drawing Sheets

STEERING COLUMN TILT SYSTEM MULTIPLIER

FIELD OF THE INVENTION

The present invention relates to steering column tilt mechanisms and more particular to a lever mechanism for actuating a tilt locking mechanism.

BACKGROUND OF THE INVENTION

Vehicle steering columns are often provided with a tiltable component that enables the steering wheel to be set at varying degrees of tilt, in accordance with the desire or need of a particular vehicle occupant. Traditionally, a manually operable lock mechanism is provided for retaining the steering wheel components in the selected tilt position.

Conventional locking mechanisms include a pawl component selectively engaging a toothed rail component. A lever mechanism is provided for operable interconnection with the pawl for selectively disengaging the pawl from engagement with the rail for enabling tilt motion of the steering wheel. As a result of this configuration, a particular amount of force is required to a release lever of the lever mechanism in order to achieve disengagement of the pawl.

More recently, technical developments, driven by improved performance requirements, have resulted in a new generation of locking mechanisms. The new generation of locking mechanisms eliminate the pawl and rail components, substituting rod and sleeve members therefor. The rod and sleeve members of the new generation of locking mechanisms require a particular force for enabling disengagement thereof.

As a result of the new configuration, the disengagement force is generally higher than that force previously required for the locking mechanisms. Thus, the vehicle occupant would be required to apply an increased amount of force to the lever mechanism to enable tilting action of the steering wheel. This is undesirable for a number of reasons including occupant comfort and ease of vehicle operation, as well as occupants being accustomed to the amount of force previously required for enabling tilting action of the steering wheel.

Therefore, it is desirable in the industry to provide an improved lever mechanism for enabling actuation of a new generation tilt locking mechanism through the application of a reduced force. The lever mechanism preferably acts as a force multiplier for multiplying an input force of a vehicle force to achieve a relatively higher output force applied for actuation of the locking mechanism.

SUMMARY OF THE INVENTION

Accordingly, the present invention provides a steering column assembly including a lower steering column member, an upper steering column member pivotally attached to the lower steering column member, a locking mechanism operably interconnecting the upper and lower steering column member and selectively actuable for locking the upper steering column member in one of a plurality of pivot positions relative to the lower steering column member, and a lever mechanism operably interconnected with the locking member for selectively actuating the locking member. The lever mechanism includes a release lever, a multiplying lever in operable communication with the locking mechanism, and a link interconnecting the release lever and the multiplying lever. The link transfers an input force applied to the release lever for multiplication through the multiplying lever for actuating the locking mechanism.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
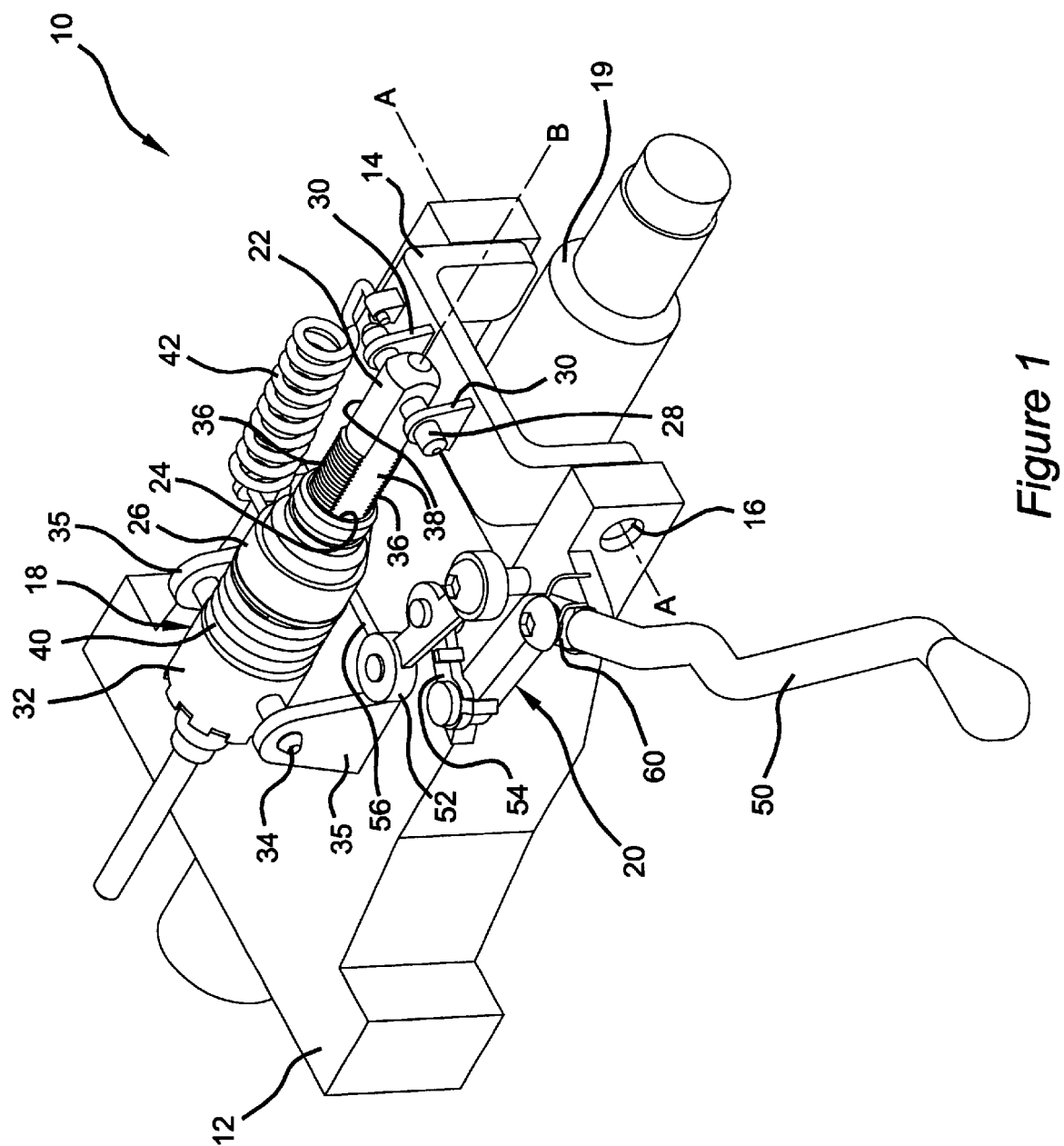
FIG. 1 is a perspective view of a steering column assembly including a locking mechanism actuable by a release mechanism.

With particular reference to FIG. 1, a steering column assembly 10 is provided and includes a stationary lower steering column member 12 and a tiltable upper steering column member 14 connected together by a pivot connection 16. The upper steering column member 14 is pivotable relative to the lower steering column member 12 about a pivot axis A, whereby a locking mechanism 18 selectively enables pivoting action. A lever mechanism 20 is mounted to the lower steering column member 12 and is in operable communication with the locking mechanism 18. As described in further detail herein, the lever mechanism 20 is operable to actuate the locking mechanism 18 for enabling pivoting action of the upper steering column member 14.

A steering shaft 19 is rotatably supported by and runs through the lower and upper steering column members 12,14, for attachment to a steering wheel (not shown). The steering shaft 19 includes a joint (not shown), such as a universal-type joint, for enabling operable flexing thereof, corresponding to the pivoting motion of the upper steering column member 14 relative to the lower steering column member 12. In this manner, the steering wheel is tiltable to a desired position and steering motion is transferred through the flexible steering shaft 19 to steered wheels (not shown) of a vehicle.

The locking mechanism 18 functions to enable locking of the upper steering column member 14 in any one of a number of pivotal positions relative to the lower steering column member 12. The locking mechanism 18 includes a rod 22 operably received through an aperture 24 of a rotatable sleeve 26 and selectively slidable therethrough. An end of the rod 22 includes a bar 28 therethrough, which is attached to fixtures 30 of the upper steering column member. The sleeve 26 is operably attached to the lower steering column member 12 by a main body 32. The main body 32 includes a bar 34 therethrough that is attached to fixtures 35 of the lower steering column member 12. The rod includes threaded surfaces 36 and flats 38 formed thereon, the threaded surfaces 36 of the rod 22 selectively engaging corresponding interior threaded surfaces (not shown) of the aperture 24.

In operation, the rod 22 is locked from axial movement about an axis B, when the threaded surfaces 36 of the rod 22 engage the threaded surfaces of the aperture 24. As the locking mechanism 18 is actuated, the sleeve 26 rotates about the axis B for achieving an unlocked position to disengage the threaded surfaces of the rod 22 and the aperture 24, thereby enabling the rod 22 to slide axially along the axis B. A spring 40 is provided about the main body 32 for biasing the sleeve 26 in a locked position, whereby the threaded surfaces 36 of the rod 22 engage the threaded surfaces of the aperture 24.

With the sleeve 26 in the unlocked position, the upper steering column member 14 is pivotable about the axis A for achieving a desired tilt position of the steering wheel. Once the desired position has been achieved, the sleeve 26 is released and returns to the locked position, under the biasing force of the spring 40, to prohibit axial motion of the rod 22 along the axis B. An upper tilt biasing spring 42 is further provided and is anchored between the lower and upper steering column members 12,14. The upper tilt biasing spring 42 biases the pivoting motion of the upper steering member 14 in an upward direction. Therefore, in the absence of a counter-acting force (e.g., a downward tilt force applied by a vehicle occupant), the upper steering column member 14 will pivot upwards about the pivot axis A under the biasing force of the tilt biasing spring 42.

Figure 2:
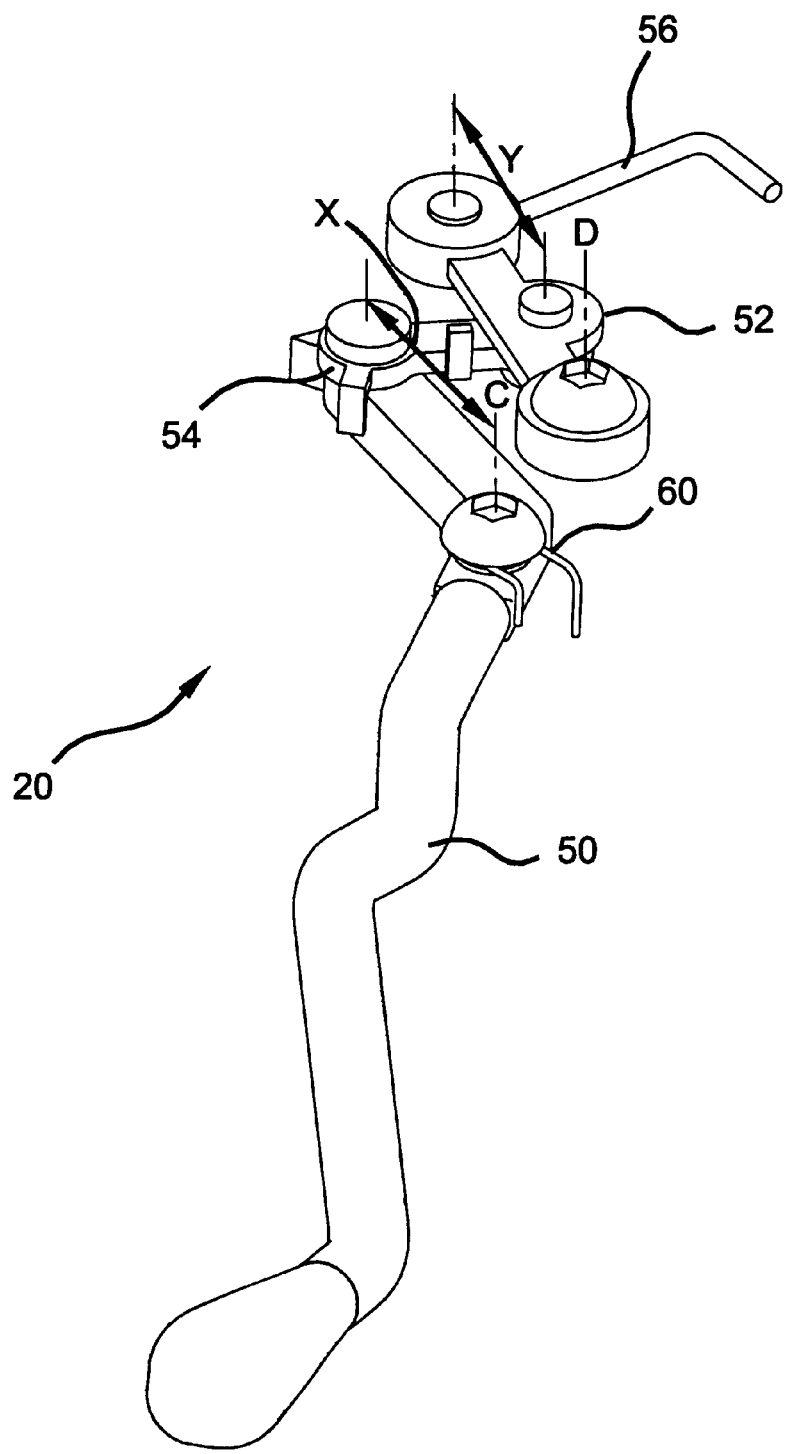
FIG. 2 is an isolated perspective view of the release mechanism.
Figure 3:
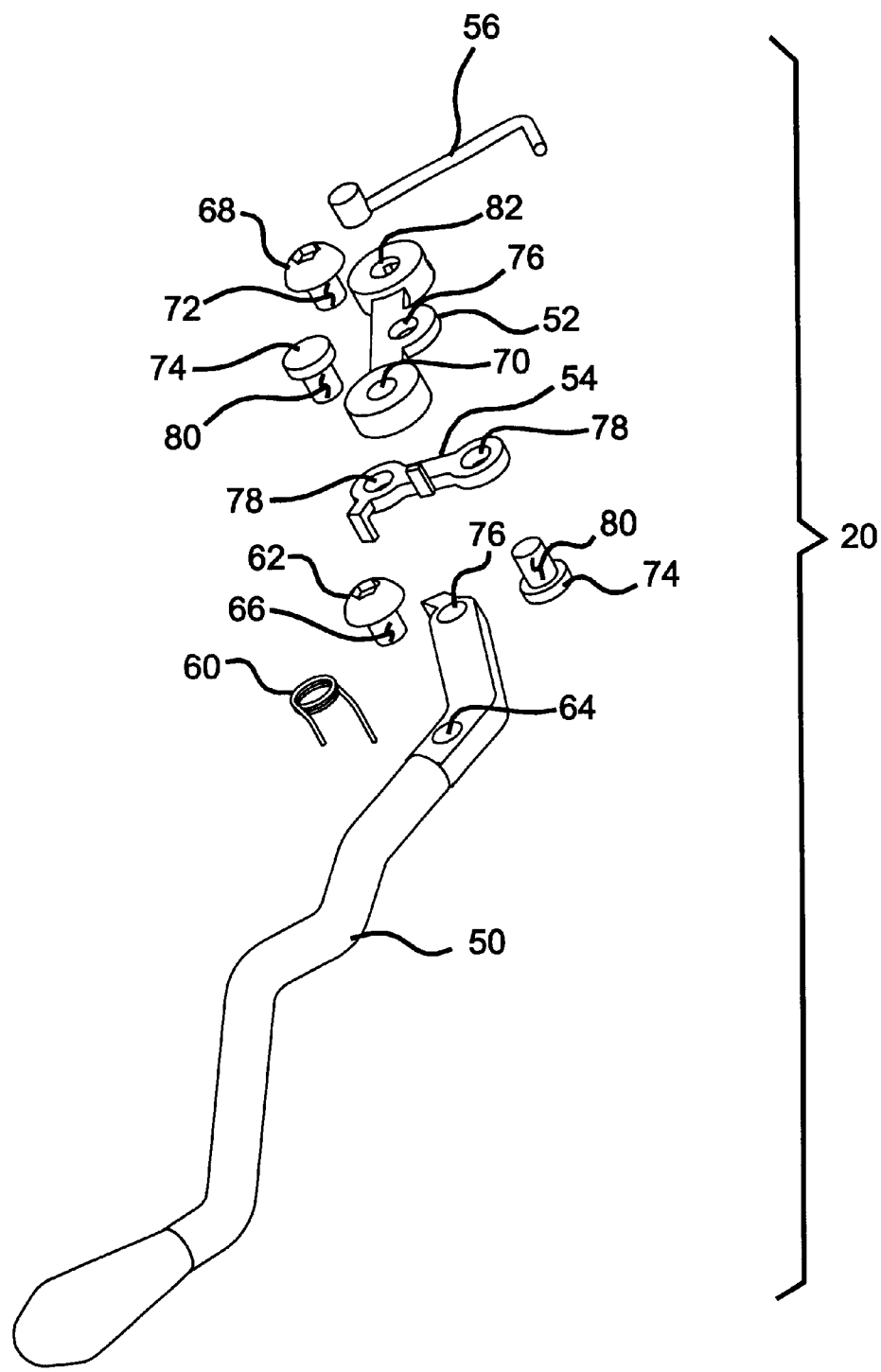
FIG. 3 is an exploded view of the release mechanism.

As mentioned above, the locking mechanism 18 is selectively actuated by the lever mechanism 20. With particular reference to FIGS. 2 and 3, the lever mechanism 20 includes a release lever 50 and a multiplier 52 operably interconnected by a link 54. The multiplier 52 is operably engaged with the sleeve 26 by a cable 56 to selectively actuate the locking mechanism 18 through motion of the release lever 50. The release lever 50 is pivotally mounted to a surface 58 of the lower steering column member 12 about a pivot axis C and the multiplier 52 is pivotally mounted to the surface 58 about a pivot axis D. The link 54 interconnects a distal end of the release lever 50 and an intermediate length of the multiplier 52. A spring 60 is anchored between the lower steering column member 12 and the release lever 50 to bias the release lever 50 in a locked position corresponding to the locked position of the sleeve 26.

A pivot pin 62 is provided for pivotally attaching the release lever 50 to the lower steering column member 12. The pivot pin 62 is received through an aperture 64 of the release lever 50 and an aperture (not shown) of the lower steering column member 12. The pivot pin 62 includes a bearing surface 66 about which the release lever 50 pivots. A pivot pin 68 is also provided for pivotally attaching the multiplier 52 to the lower steering column member 12 and is received through an aperture 70 of the multiplier 52 and an aperture (not shown) of the lower steering column member 12. The pivot pin 68 includes a bearing surface 72 about which the multiplier 52 pivots. Rivets 74 are provided for pivotal attachment of the link 54 between the release lever 50 and the multiplier 52. The rivets 74 are received through apertures 76 of the release lever 50 and multiplier 52 and apertures 78 of the link 54. The rivets 74 include bearing surfaces 80 about which the link 54 pivots. The multiplier 52 includes an aperture 82 for attachment of an end of the cable 56 thereto.

The configuration of the present invention enables multiplication of an operation force applied to the release lever 50. More specifically, a distance X between the centerlines of the pivot pin 62 of the release lever 50 and the rivet 74 of the link 54 defines a first lever arm, and a distance Y between the centerlines of the rivet 74 of the link 54 and the pivot pin 68 of the multiplier 52 defines a second lever arm. In accordance with the present invention, the distance Y is approximately one half of the distance X. Therefore, in accordance with this arrangement, a pulling force through the link 54 is multiplied by a factor of approximately 1.5 as applied to the cable 56. In other words, the multiplier 52 provides a ratio of 1.5:1 between the output force (i.e. cable pulling force) and an input force (i.e. pulling force of the link 54 on the multiplier 52). It will be appreciated, however, that the multiplying ratio may be manipulated by varying the distance Y relative to the distance X, whereby an increase in the distance Y results in a higher ratio and a decrease in the distance Y results in a lower ratio.

The lever mechanism 20 of the present invention includes a mechanically advantageous configuration. The configuration, as described herein, enables a reduced amount of force to actuate the locking mechanism 18 through the lever mechanism 20. Specifically, a force applied to the release lever 50 is multiplied via the link 54 and multiplier 52 configuration. Therefore, a reduced amount of force need be applied to the release lever 50 than in the case of a direct connection between the release lever 50 and the locking mechanism 18. In this manner, comfort of a vehicle occupant is maintained by enabling the vehicle occupant to easily operate the lever mechanism 20 for enabling desired tilting of the steering wheel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A steering column assembly, comprising:
   a lower steering column member;
   an upper steering column member pivotally attached to said lower steering column member;
   a locking mechanism operably interconnecting said upper and lower steering column member and selectively actuable for locking said upper steering column member in one of a plurality of pivot positions relative to said lower steering column member, the locking mechanism comprising a main body, a locking sleeve rotatably supported by said main body, and a tilt rod slidably received through said main body and said locking sleeve, said sleeve selectively engaging said tilt rod and prohibiting linear movement thereof; and
   a lever mechanism operably interconnected with said locking mechanism for selectively disengaging said locking mechanism, said lever mechanism comprising:
      a release lever;
      a multiplying lever in operable communication with said locking mechanism; and
      a link interconnecting said release lever and said multiplying lever, said link transferring an input force applied to said release lever for multiplication through said multiplying lever for disengaging said locking mechanism.

2. The steering column assembly of claim 1, further comprising a flexible steering shaft running through and rotatably supported by said upper and lower steering column members, said flexible steering shaft correspondingly flexing with respect to pivoting of said upper steering column member relative to said lower steering column member.

3. The steering column assembly of claim 1, further comprising a tilt spring anchored between said upper and lower steering column members and biasing said upper steering column member in a tilt direction relative to said lower steering column member.

4. The steering column assembly of claim 1, wherein said locking mechanism further comprises a locking spring for biasing said locking sleeve into engagement with said tilt rod, thereby prohibiting linear movement thereof.

5. The steering column assembly of claim 4, wherein said lever mechanism is operable to rotate said locking sleeve against a biasing force of said locking spring for enabling linear movement of said tilt rod therethrough.

6. The steering column assembly of claim 1, further comprising a spring biasing said release lever in a first position.

7. The steering column assembly of claim 1, further comprising a cable interconnecting said multiplying lever and said locking mechanism.

8. The steering column assembly of claim 1, wherein a distance between a pivot point of said release lever and an interconnection point with said link defines a first lever arm.

9. The steering column assembly of claim 8, wherein a distance between an interconnection point of said multiplying lever and said link and an end attachment point of said multiplying lever defines a second lever arm.

10. The steering column assembly of claim 9, wherein a ratio of said first and second lever arms defines a fixed multiplying ratio of the lever mechanism.

11. The steering column assembly of claim 1, wherein the input force applied to the release lever is multiplied through the multiplying lever at a substantially constant ratio throughout the operating range of the lever mechanism.

* * * * *